United States Patent [19]

Okamura et al.

[11] Patent Number: 5,316,572
[45] Date of Patent: May 31, 1994

[54] METHOD OF MANUFACTURING CONCRETE FOR PLACEMENT IN AIR NOT REQUIRING CONSOLIDATION

[75] Inventors: Hajime Okamura, Urayasu; Koichi Maekawa, Hino; Kazumasa Ozawa, Tokyo, all of Japan

[73] Assignee: NMB Ltd., Tokyo, Japan

[21] Appl. No.: 947,971

[22] PCT Filed: Sep. 21, 1992

Related U.S. Application Data

[63] Continuation of Ser. No. 730,902, filed as PCT/JP90/00758, Jun. 11, 1990, abandoned.

[30] Foreign Application Priority Data

Dec. 11, 1989 [JP] Japan .................. 1-318729

[51] Int. Cl.$^5$ ................................. C04B 7/02
[52] U.S. Cl. .................... 106/714; 106/724; 106/728; 106/737
[58] Field of Search ............... 106/713, 714, 716, 721, 106/728, 724, 730, 731, 737, 708

[56] References Cited

U.S. PATENT DOCUMENTS

| | | | |
|---|---|---|---|
| 4,046,583 | 9/1977 | Collepardi | 106/726 |
| 4,052,220 | 10/1977 | Turpin, Jr. | 106/725 |
| 4,188,231 | 2/1980 | Valore | 106/708 |
| 4,205,993 | 6/1980 | Rosenberg et al. | 106/726 |
| 4,746,364 | 5/1988 | Kawai et al. | 106/708 |
| 5,010,124 | 4/1991 | Olsson et al. | 106/743 |

FOREIGN PATENT DOCUMENTS

| | | |
|---|---|---|
| 2221420 | 10/1974 | France . |
| 50-29637 | 3/1975 | Japan . |
| 53-32368 | 9/1978 | Japan . |
| 57-123850 | 8/1982 | Japan . |
| 58-60651 | 4/1983 | Japan . |
| 58-69760 | 4/1983 | Japan . |

OTHER PUBLICATIONS

*Design and Control of Concrete Mixtures*, Portland Cement Assoc., pp. 2, 3, 47, 48, 52–56, 64–71, 82, 104, 105. Thirteenth Edition (1988).
*Handbook of Structural Concrete* Kong et al. (1983) pp. 8–31 (Chapter 9).
*Concrete Admixtures Handbook* Ramachandran (1984) pp. 116–118, 124, 125, 211, 214, 232–235, 260, 269–273, 278–285, 337–345.
Standard Specifications for Concrete, (and English translation thereof) noting pp. 53, 67, 72–73, 74 (1989).
Concrete Library, No. 51, "Guide to Placement of Superplasticized Concrete," (and English translation thereof) noting pp. 3, 32–33 (1987).

*Primary Examiner*—Mark L. Bell
*Assistant Examiner*—Paul Marcantoni
*Attorney, Agent, or Firm*—Birch, Stewart, Kolasch & Birch

[57] ABSTRACT

Concrete for placement in air featured by the quantity of mixing water of not more than 175 kg/m$^3$, the content of hydraulic component materials of 400–700 kg/m$^3$, nonuse of anti-foaming agent, the addition of a water-soluble polymer substance in an amount such as will give a viscosity in a range of 5 to 2,000 centipoises when dissolved in 1,000 g of water of 20° C., and further, the addition of a high-range air-entraining, water-reducing agent in 0.1 to 2% by dry weight of the hydraulic component materials. This method of manufacturing concrete for placement in air has the effects of extremely little segregation, high deformability, and no necessity for consolidation.

5 Claims, 2 Drawing Sheets

METHOD OF MANUFACTURING CONCRETE FOR PLACEMENT IN AIR NOT REQUIRING CONSOLIDATION

This application is a continuation of application Ser. No. 07/730,902 filed as PCT/JP90/00758, Jun. 11, 1990, now abandoned.

BACKGROUND OF THE INVENTION

1. Field of Invention

This invention relates to a method of manufacturing concrete for placement in air not requiring consolidation by using a hydraulic component material as a binder; not using any anti-foaming agent; and adding small amounts of a water-soluble polymer substance and a high-range air-entraining water-reducing agent.

2. Description of Related Art

Concrete is a composite of materials of different specific gravities such as cement, water, aggregates, and admixtures. Consequently, the Japan Society of Civil Engineers has prescribed many principles in the Standard Specifications for Concrete in view of the present engineering level. Thus, in the clause on mixing, it is stipulated that "mixing shall be performed thoroughly until the mixed concrete has become uniform in quality," and, in the clause on transporting and placing, that "they shall be done in a manner that the segregation of the concrete will be minimized," and further that "concrete is liable to show segregation even when transporting with considerable care concretes of suitable mix proportions. When extreme segregation has been recognized during transportation, thorough re-mixing shall be done to obtain a concrete of uniform quality." It is further prescribed that "the concrete placed shall not be moved laterally inside the form", while indicating that this is ". . . because there is a possibility of concrete segregating every time it is handled." In the clause on consolidation, it is prescribed that "internal vibrators shall be used in principle for consolidation of concrete.", that "concrete, after placement, shall quickly be thoroughly consolidated and reach around reinforcing bars and into corners of the form," and also that "at parts difficult for concrete to reach as where reinforcing bars are densely placed, it is necessary for careful consolidation to be done before the workability of the concrete declines."

As is clear from such principles, even with a concrete which has been adequately mixed by a mixer to be of uniform quality, segregation is liable to occur during the processes of transportation, placement, and consolidation, and reinforcing bars placed densely are great obstacles to flow of concrete, thus causing segregation between mortar and aggregates to take place, with aggregate particles repeatedly coming into contact with each other and congregating locally to close off the gaps between reinforcing bars to obstruct flow of concrete.

It is therefore considered important that in concreting, concrete should be thoroughly consolidated carefully using vibrators while paying special attention, and to fill up all corners of the form.

In recent years, superplasticized concrete (see Japan Society of Civil Engineers (a corporate juridical person)—Concrete Library, No. 51, Guide to Placement of Superplasticized Concrete (Draft)), frequently used as a new technology, is designed to take, with the advent of high-range water-reducing agents, advantage of their powerful dispersing action, and thereby to improve workability as fluid concrete through addition of fluidifier (high-range water-reducing agent) to dry-mix concrete without adding water, but even with superplasticized concrete, segregation is liable to occur in case of dense reinforcement, it further being the principle to use vibrators (internal) for consolidation.

The problematic points as mentioned below exist in concrete widely used at present.

An attempt to increase the fluidity of fresh concrete gives rise to a trend for unit water content to be increased, and for strength and durability to be decreased. Further, when only fluidity is high and deformability is not good, segregation is liable to occur in case there are obstacles such as reinforcing bars, and good filling properties cannot be obtained.

In order to overcome these problems, it is considered an important technological objective to be achieved in this field of engineering to develop a concrete, which not only excels in deformability in its fresh state, but also possesses high resistance to segregation, and which, even without using vibrators, can fill up all corners of forms for concrete members of complex configurations, members with high densities of reinforcing bars, and intricate parts of concrete members.

SUMMARY OF THE INVENTION

The inventors, with the aim of manufacturing concrete for placement in air without consolidation required and with almost no segregation, which has high deformability as well as a self-levelling property, focused on fluidity of concrete and the segregation phenomenon occurring during flow of concrete, and as a result of various studies, have found that by causing inorganic powder of gradation finer than cement to be mixed in between cement particles, and moreover, utilizing spherical inorganic fine powder with the aims of reducing water content and making viscosity suitable as well as increasing resistance to segregation; and also using in combination a high-range air-entraining, water-reducing agent and a water-soluble polymer, it is possible to manufacture a concrete with friction between solids reduced, fluidity increased, and segregation resistance (deformability) increased at low water content, having a self-levelling property and high fluidity, and moreover, excelling in high deformability leading to good space-filling property and no necessity for consolidation. To describe this in detail, the inventors have found a method of manufacturing concrete to be placed in air, which, in contrast with conventional concrete, possesses the features of extremely little segregation, high deformability, and no necessity for consolidation, by means of using not more than 175 kg/m$^3$ of mixing water and a specific quantity of hydraulic component materials, not using any anti-foaming agent, and using in combination a water-soluble polymer and a high-range air-entraining, water-reducing agent in the process of manufacturing concrete. Consequently, this invention offers a method of manufacturing concrete placeable in air without requiring consolidation, which is excellent in fluidity, low in segregation and high in deformability, by using not more than 175 kg/m$^3$ of mixing water and 400 to 700 kg/m$^3$ of hydraulic component materials; not using any anti-foaming agent; adding a water-soluble polymer substance in such a quantity as will give a viscosity in a range of 5 to 2,000 centipoises when dissolved in 1,000 g water at 20° C.; and also adding a high-range air-entraining, water-reducing agent in a quantity of 0.1 to 2% by weight of the hydraulic component materials in terms of dry weight.

The method of this invention will be described in detail below.

The hydraulic component materials used in the method of this invention may be a mixture with portland cement of one or a mixture of two or more materials selected from blast-furnace slag powder, expansive agent, fly ash, silica powder, and natural mineral powders.

It is preferable for the fineness of the fine-powder assemblage containing the abovementioned hydraulic component materials to be 2,500 to 7,000 cm$^2$/g in terms of Blaine value.

With fineness lower than 2,500 cm$^2$/g, it is ordinary, not possible to adequately suppress settling of concrete due to segregation and occurrence of bleeding. On the other hand, with fineness higher than 7,000 cm$^2$/g, to secure the required deformability, increased unit water content and an excessive dosage of high range air-entraining, water reducing agent are needed and further such manufacture of fine-powder assemblage containing hydraulic component materials will result in increases in the expense required for grinding. It is essential that concrete for placement in air and not requiring consolidation excel in fluidity and deformability during its placement, and that segregation be difficult to occur. For this purpose, to use hydraulic component materials consisting of substances of specific fineness in quantities of at least 400 to 700 kg per cubic meter of concrete is one of the conditions, but the mere use of specific quantities of the said fine powder assemblage has its limits in terms of securing sufficient fluidity, deformability, and segregation resistance, and therefore is not enough.

The inventors, without using any anti-foaming agent in the hydraulic component materials, but by using an extremely small quantity of water-soluble polymer together with a high-range air-entraining, water-reducing agent, and moreover, keeping the quantity of mixing water at not more than 175 kg per cubic meter, have now succeeded in providing a method of manufacturing concrete for placement in air and not requiring consolidation, which shows little segregation and high deformability and is adaptable to a wide range of applications.

The water-soluble polymer substance used in the method of this invention is one or a mixture of two or more materials selected from cellulose-based substances, acrylic-based substances, acrylamide-based substances, polyvinyl alcohol-based substances, and gum arabic, and normally, refers to thickeners used for special underwater concrete, enhancing pumpability of concrete, or reducing generation of dust in pneumatically-applied concrete. For example, in respect of the quantity of water-soluble polymer substance used for special underwater concrete, as disclosed in Japan Patent Kokai Sho-58-69760 (Japanese Unexamined Patent Application Publication No. 69760/'83), the optimum dosage necessary for its effects to be demonstrated is in a range of high dosage such as will give a viscosity of 2,000 to 100,000 centipoises when dissolved in mixing water at 20° C. Ordinarily, when a water-soluble polymer substance is used at high dosage, an unnecessarily high air-entraining property is exhibited and causes a substantial decrease in strength so that an anti-foaming agent must be used, but the dosage range of water-soluble polymer substance used in the method of this invention is a quantity corresponding to that which will give a viscosity in a range of 5 to 2,000 centipoises when dissolved in 1,000 g of water at 20° C., and because of the fact that the quantity of free water present in fresh concrete is small, a low dosage extremely smaller than generally used will suffice, and anti-foaming agent is not used.

In general, when a water-soluble polymer substance is added, the deformation resistance of concrete increases, while there is the effect of extremely effectively reducing the friction mechanism between individual particles, and its use in combination with a high-range air-entraining, water-reducing agent will be effective in suppressing congregation of aggregate particles and imparting high deformability.

Consequently, in order to manufacture concrete for placement in air showing little segregation, having high deformability, and not requiring consolidation, the necessary conditions will be the range of the quantity used of a hydraulic component material consisting of a mixture of portland cement and one or more materials selected from blast-furnace slag powder, expansive agent, fly ash, silica powder, and natural mineral powders; establishment of an upper limit to the quantity of mixing water; combined use of a small amount of water-soluble polymer substance and a high-range air entraining, water-reducing agent; and moreover, nonuse of an anti-foaming agent.

The high-range air-entraining, water-reducing agent employed in the method of this invention may be selected, if desired and where appropriate, from various cement additives normally used, but is a surface-active agent of high dispersing capability not incurring excessive set retardation or air-entrainment even when used in large quantities. For example, those with formalin condensates of $\beta$-naphthalene sulfonates, formalin condensates of melamine sulfonates, polystyrene sulfonates, hydroxy polyacrylates, copolymers of $\alpha$-, $\beta$-unsaturated dicarboxylic acid and olefin, copolymers derived from polyethylene glycol monoallyl ethers and maleic acid-base monomers, copolymers of isobutylene-styrene maleic acid base, isobutylene-acrylic acid ester-maleic acid base, isobutylene-styrene-acrylic acid ester-maleic acid base, denatured lignosulfonate compounds, aromatic aminosulfonic acid-based high molecular compounds as main ingredients may be cited.

The dosage of high-range air-entraining, water-reducing agent, in terms of dry weight, is 0.1 to 2% by weight of 100 parts by weight of the hydraulic component materials. A high-range air-entraining, water-reducing agent is especially necessary to keep the quantity of mixing water at not more than 175 kg per cubic meter in the process of manufacturing concrete. Further, through its combined use with a small amount of water-soluble polymer substance without using any anti-foaming agent, it is possible for excellent deformability to be imparted to the concrete, and both reduction of unit water content and deformability can be secured. The timing of addition of these various additives is a matter of choice. Thus, in the process of mixing concrete, all or part of the dosage in the mix proportions may be made to be contained in the hydraulic component materials, or all or part of the dosage in the mix proportions to be added to the mixing water prior to mixing.

Furthermore, to the concrete for placement in air with little segregation and high deformability and not requiring consolidation according to the method of this invention, it is possible, depending on the purpose, for other cement additives customary in cement concrete technology, for example, expansive agent, set accelerator, set retarder, strength-increasing agent, air content-regulating agent, cold-resisting agent, anti-freezing agent, pigment, etc. to be selected, if desired and where appropriate, and optionally in combination.

In construction according to the method of this invention, it is also possible for various fibers and meshes to be incorporated, and to use various fibers will give a concrete of greater toughness compared with conventional concrete, excelling in resistance to cracking, and further with improved durability. As such fibers, for example, steel fiber, stainless steel fiber, glass fiber, carbon fiber, aramid fiber, vinylon fiber, alumina fiber, asbestos, polypropylene fiber, polyethylene fiber, acrylic fiber, nylon fiber, natural or synthetic mineral fiber, whiskers, amorphous metal fiber, silicon carbide fiber, Tyranno fiber, potassium titanate fiber, boron fiber, etc. may be cited.

As stated in the foregoing, by carrying out thorough blending and mixing uniformly under selective mix proportioning conditions for various materials, it becomes possible for concrete placeable in air without requiring consolidation to be manufactured, and concrete made by the method of this invention will have the characteristics as follows:

① High fluidity and excellent deformability
② Space filling properties permitting placement to be done without consolidation work
③ Excellent segregation resistance
④ Extreme reduction of bleeding The concrete for placement in air and not requiring consolidation according to the method of this invention, is comprised of a dense cement matrix with the various excellent characteristics ① to ④ mentioned above, and this makes it possible for the fundamental problems faced by concrete manufacturers generally used at present to be resolved. Consequently, the method of this invention may be employed for a wide range of uses, examples of which are civil and architectural structures in general, tunnel linings, mass concrete, backfilling of gutters and the like, cases of placing concrete in narrow gaps of prestressed concrete and precast concrete or into intricate forms or construction of concrete structures as where reinforcing bars are densely placed.

In the following, this invention will be described in more concrete terms through examples and the like, referring to the drawings attached. In the test results given in Tables 1 to 4, the values of percent passing and the evaluation of space-filling property studied for the purpose of judging the deformability and resistance to segregation of fresh concrete are indicated.

DETAILED DESCRIPTION OF PREFERRED EMBODIMENTS

Figure 1:
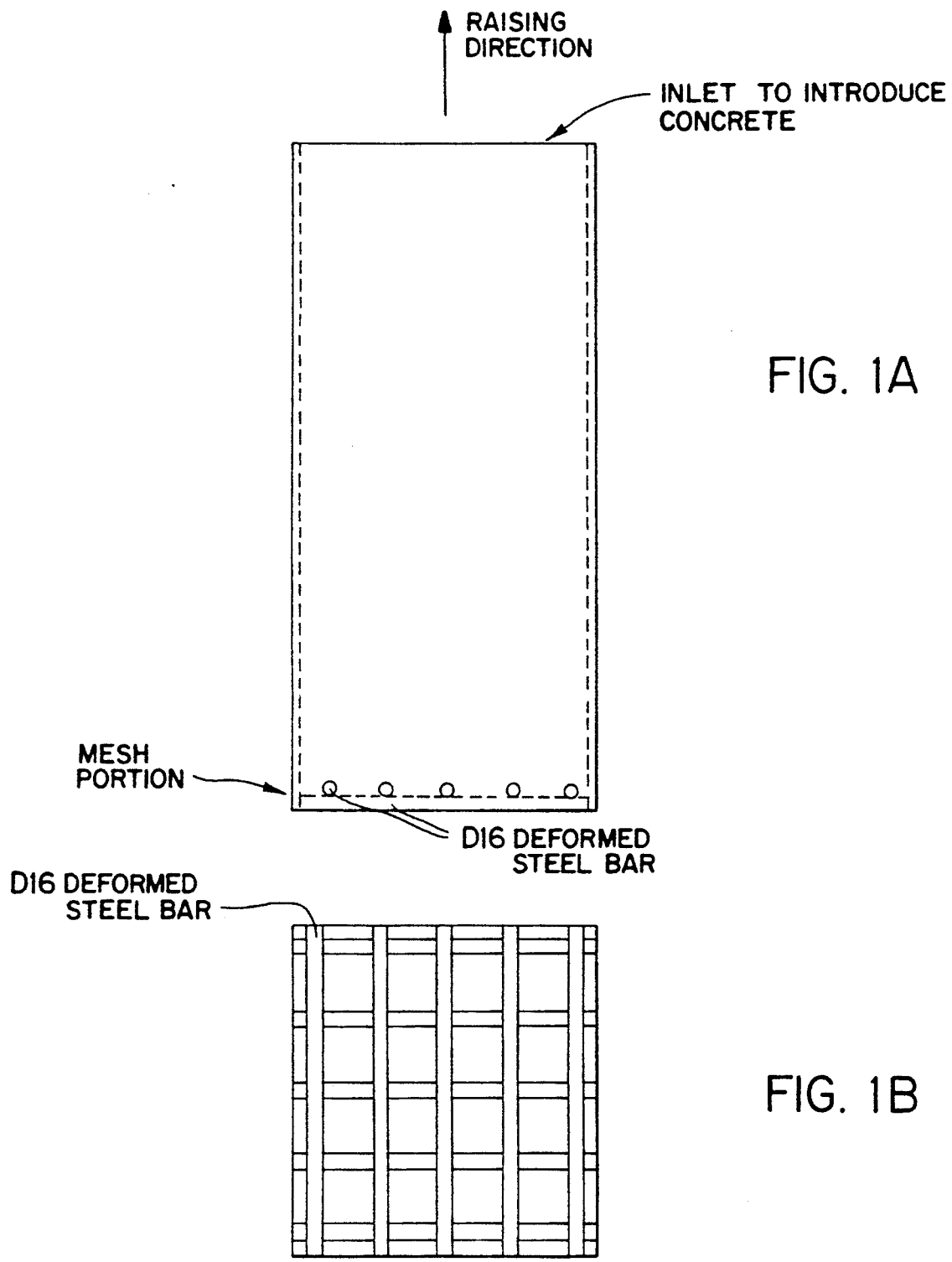
FIG. 1 shows the model form No. 1 for testing used in the tests for evaluation of deformability and segregation resistance in the examples given in this description.

Form No. 1 shown in FIG. 1 is a device in tube form with the bottom in the form of a square mesh, the mesh portion consisting of D16 deformed bars arranged in grid form and having openings of 5 cm × 5 cm, and the side walls being made of 8-mm thick steel plates.

Figure 2:
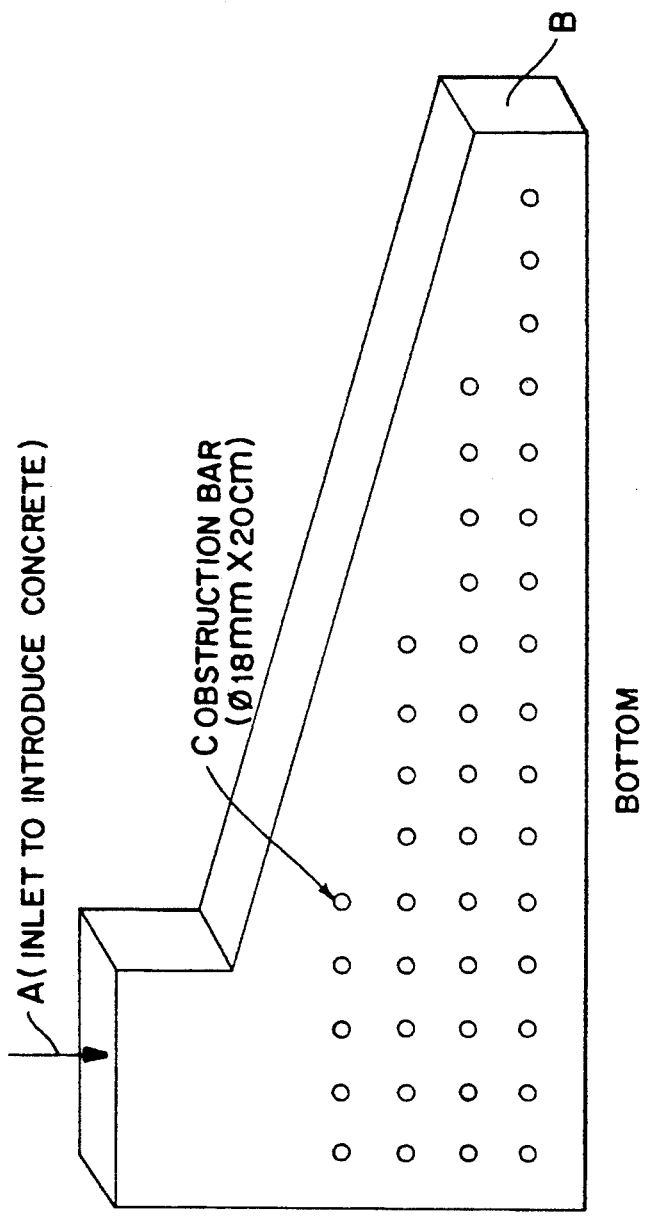
FIG. 2 likewise shows the transparent acrylic resin plate model form No. 2 used for evaluation of filling property.

Form No. 2 shown in FIG. 2, is made of 12-mm thick transparent acrylic resin plates which are joined in a manner that they can be detached, with sealing provided at the joints to prevent leakage of water therefrom.

In the lower half of the form, there are a total of 43 bars (C) of outside diameter 18 mm and length 200 mm arranged horizontally at four levels and in a manner for outside spacing to be 3 cm, to obstruct flow of concrete.

Method of Test for Evaluating Performance of Concrete for Placement in Air Not Requiring Consolidation Test Method No. 1: Test for Evaluating Concrete for Deformability and Resistance to Segregation For the purpose of judging the deformability and segregation resistance of concrete, the condition of reinforcing bars densely placed in a reinforced concrete structure was modeled on, and using the deformed bars (designated D16) shown in FIG. 1, a form of the inside dimensions length 30 cm × width 30 cm × height 60 cm with a mesh structure of bars placed horizontally to provide openings of 5 cm (hereafter referred to as "model form for testing") was fabricated, and this was used in the tests of the examples. The testing was carried out by placing the above-mentioned model form for testing on a smooth and flat steel plate, filling the form with approximately 30 l of fresh concrete and determining, when subsequently raising the model form for testing at a rate of 10 cm/sec to a height of 20 cm, the percent passing by the calculation formula below based on the volume of concrete passing the mesh openings of its own weight, taking this to be the index for judging the deformability and resistance to segregation of the concrete.

$$\text{Percent passing } (\%) = \frac{B}{A} \times 100$$

A: volume of concrete charged (l)
B volume of concrete passing (l)

Test Method No. 2: Method of Evaluating Concrete for Space Filling Property

For concrete with percent passing exceeding 60%, the model form of transparent acrylic resin plate of thickness 10 mm shown in FIG. 2 was used and the space-filling property in case consolidation was not done was evaluated. The model form was of the configuration shown in FIG. 2, with height of 40 cm, length of 90 cm, and width of 20 cm, and inside the model form a total of 43 vinyl chloride pipes C of length 20 cm and diameter 18 mm assumed to be reinforcing bars were placed horizontally, with outside spacing horizontally and perpendicularly made 3 cm, as a model on the condition of reinforcing bars arranged most densely in a reinforced concrete structure, and according to this test, any concrete other than the desired concrete excelling in fluidity and deformability will incur segregation during flowing due to the reinforcing bars, and the degree of blocking (congregation) of the aggregate can be a measure for the quality of the space-filling property inside the form. The evaluation of the space-filling property was made by introducing concrete from A at the top of the model form shown in FIG. 2, and when the inside of the form was more or less completely filled was marked ⊚, when the concrete reached the tip B of the model form but air bubbles were generated on the concrete surfaces in contact with the side surfaces of the form was marked ○, and when the concrete did not reach the tip B of the model form and complete filling was not achieved, thus not falling within the concrete for placing in air not requiring consolidation according to the method of this invention was marked ×.

EXAMPLES

Using ordinary portland cement (manufactured by Sumitomo Cement Co., Ltd.) as the cement and the materials and mix proportions given in Tables 1 to 4, concretes were prepared by mixing for 3 minutes with a pan type forced mixing mixer.

The test results of Experiment Nos. 1-6 given in Table 1 are for cases for comparison where the hydraulic component material consisted of ordinary portland cement alone with only high-range air-entraining, water-reducing agent used and unit water contents made 175 kg/m$^3$ and 195 kg/m$^3$, showing no satisfactory values in the evaluation of percent passing according to this test method. However, as shown in Experiment Nos. 3, 4 and 6, where ordinary portland cement was used in large quantities of 500 to 700 kg per cubic meter, in spite of the slump values and unit water contents being identical with those in Experiment No. 2, increases in percent passing of fresh concrete were recognized. However, as shown by the method as in Experiment No. 5, where although the unit cement content was high the unit water content was increased, a decline in percent passing, in spite of the slump value being the same as in Experiment Nos. 2-4 and 6 was seen conversely, making it impossible to impart a high deformability and segregation resistance to the concrete. This was due to coarse aggregate in concrete segregating and causing blocking (congregation) on the mesh-form reinforcements to lower the passage rate.

The test results of Experiment Nos. 7-16 shown in Table 2 are for cases of using mixtures of ordinary portland cement and fly ash (manufactured by EPDC Fly Ash Co., Ltd.) as hydraulic component materials, and compared with Experiments No. 2 to No. 4 and No. 6 shown in Table 1, the percentages of fresh concrete passing with the same amounts of hydraulic component materials were increased further. However, Experiment Nos. 7-11 were cases for comparison with the quantities per cubic meter of hydraulic component materials varied within a range of 400 to 700 kg and did not correspond to such concrete for placement in air having a high deformability and requiring no consolidation as could be offered for actual construction. Experiment Nos. 12-16 were examples according to the method of this invention in which small amounts of water-soluble polymer were added to the mix proportions of Experiment Nos. 7-11, and by the addition of small amounts of water-soluble polymer substance the percentages of fresh concrete passing were exceedingly improved, and the use of concrete for placement in air of high deformability and not requiring consolidation was made possible in actual construction.

The test results of Experiment Nos. 17-30 given in Table 3 are for cases of using mixtures of ordinary portland cement and blast-furnace slag powder (Esment, manufactured by Nippon Steel Corporation, fineness: 5,700 cm$^2$/g) as the hydraulic component material, and compared with Experiment Nos. 2-4 and 6 shown in Table 1, the percentages of fresh concrete passing with the same amounts of hydraulic component materials were further increased, as was the case with mixtures with fly ash. However, in Experiment Nos. 17-23 which are cases for comparison with the quantities of hydraulic component materials varied within a range of 400 to 700 kg per cubic meter, the concrete obtained did not correspond to concrete for placement in air of high deformability and not requiring consolidation. Experiment Nos. 24-30 are examples according to the method of this invention in which small amounts of water-soluble polymer were added to the mix proportions of Experiment Nos. 17-23, and by the addition of small amounts of water-soluble polymer, the percentages of fresh concrete passing were exceedingly improved, and the use of concrete for placement in air of high deformability and not requiring consolidation was made possible in actual construction.

The test results of Experiment Nos. 31-51 given in Table 4 are for cases of mixing and using ordinary portland cement, fly ash, and blast-furnace slag powder as hydraulic component materials, with the types and amounts of water-soluble polymer substances used varied. Experiment No. 52 was a case of using a mixture of ordinary portland cement, fly ash, blast-furnace slag powder, and expansive agent as the hydraulic component materials, while Experiment No. 53 was a case of the same mix proportion as in Experiment No. 52, but with a polycarboxylic acid-base cement additive used as the high-range air-entraining, water-reducing agent.

Experiment Nos. 39-53, as compared with Experiment Nos. 31-38 show that the replacement of cement with large quantities of blast-furnace slag powder and fly ash and the use of small amounts of water-soluble polymer resulted in significant increases in percent passing of fresh concrete.

As seen in the test results given in Tables 1 to 4, compared with concretes of mix proportions not using blast-furnace slag powder and fly ash, or mix proportions not using water-soluble polymer, and mix proportions (Experiment Nos. 36-38) with those amounts of water-soluble polymer substance used which gave viscosity values outside the range of this invention, the concrete for placement in air not requiring consolidation according to the method of this invention, when evaluated using a test form modeled on the condition of the most densely placed reinforcement in a reinforced concrete structure, was confirmed to have been exceedingly improved in deformability, segregation resistance, and property of filling spaces of fresh concrete. Furthermore, concretes according to the method of this invention showed extremely little bleeding during and after filling into model forms.

TABLE 1

| | Mix proportions | | | | | | | | |
|---|---|---|---|---|---|---|---|---|---|
| | Hydraulic component material | | | | Water-soluble polymer | | | High-range AE water-reducing agent | |
| Experiment No. | Cement kg/m$^3$ | Blast-furnace slag powder kg/m$^3$ | Fly ash kg/m$^3$ | Expansive agent kg/m$^3$ | Type | Amount Used (g/m$^3$) | Viscosity when dissolved in 1000 g water (cp) | Type | Dosage kg/m$^3$ |

TABLE 1-continued

| | | | | | | | | | | |
|---|---|---|---|---|---|---|---|---|---|---|
| Comparative example | 1 | 400 | 0 | 0 | 0 | — | 0 | — | — | 0 |
| | 2 | 400 | 0 | 0 | 0 | — | 0 | — | E | 1.13 |
| | 3 | 500 | 0 | 0 | 0 | — | 0 | — | E | 1.83 |
| | 4 | 600 | 0 | 0 | 0 | — | 0 | — | E | 2.34 |
| | 5 | 600 | 0 | 0 | 0 | — | 0 | — | E | 1.19 |
| | 6 | 700 | 0 | 0 | 0 | — | 0 | — | E | 2.95 |

| | | Mix proportions | | | Test results | | | | | |
|---|---|---|---|---|---|---|---|---|---|---|
| | | | Water-hydraulic component material ratio (%) | Percent fine aggregate (%) | | | % concrete passing measured | | | |
| | Experiment No. | Water content (kg/m³) | | | Slump (cm) | Air content (%) | Volume sampled A (l) | Volume passing B (l) | % passing $\frac{B}{A} \times 1000$ (%) | Filling property evaluation |
| Comparative example | 1 | 216 | 54.0 | 50.0 | 19.0 | 1.5 | 30 | 10.2 | 34 | — |
| | 2 | 175 | 43.8 | 49.0 | 21.5 | 2.6 | 30 | 0.9 | 3 | — |
| | 3 | 175 | 35.0 | 49.0 | 22.0 | 2.6 | 30 | 6.0 | 20 | — |
| | 4 | 175 | 29.2 | 49.0 | 22.0 | 2.7 | 31 | 8.4 | 27 | — |
| | 5 | 195 | 32.5 | 50.0 | 22.5 | 2.1 | 30 | 2.1 | 7 | — |
| | 6 | 175 | 25.0 | 49.0 | 22.5 | 2.0 | 30 | 10.8 | 36 | — |

Note
1) Concrete testing temperature: 20-21° C.
2) Cement: ordinary portland cement (specific gravity 3.16) manufactured by Sumitomo Cement Co., Ltd.
3) Fine aggregate: Oi river System pit sand (specific gravity 2.63, fineness modulus 2.71)
4) Coarse aggregate: Ome sandstone crushed stone (specific gravity 2.64, maximum particle diameter 20 mm)
5) Water-soluble polymer substance: Hi-metrose (B:65SH-4000) manufactured by The Shin-Etsu Chemical Co., Ltd.
6) High-range air-entraining, water-reducing agent E: Rheobild SP-9HS manufactured by Nisso Master Builders Co., Ltd. (dosages indicated in terms of dry weight)

TABLE 2

| | | Mix proportions | | | | | | | |
|---|---|---|---|---|---|---|---|---|---|
| | | Hydraulic component material | | | | Water-soluble polymer | | High-range AE water-reducing agent | |
| | Experiment No. | Cement kg/m³ | Blast-furnace slag powder kg/m³ | Fly ash kg/m³ | Expansive agent kg/m³ | Type | Amount Used (g/m³) | Viscosity when dissolved in 1000 g water (cp) | Type | Dosage kg/m³ |
| Comparative example | 7 | 300 | 0 | 100 | 0 | — | 0 | — | E | 1.12 |
| | 8 | 400 | 0 | 100 | 0 | — | 0 | — | E | 1.65 |
| | 9 | 300 | 0 | 200 | 0 | — | 0 | — | E | 1.65 |
| | 10 | 400 | 0 | 200 | 0 | — | 0 | — | E | 2.10 |
| | 11 | 500 | 0 | 200 | 0 | — | 0 | — | E | 2.65 |
| Example | 12 | 300 | 0 | 100 | 0 | B | 12 | 200 | E | 1.12 |
| | 13 | 400 | 0 | 100 | 0 | B | 12 | 200 | E | 1.65 |
| | 14 | 300 | 0 | 200 | 0 | B | 12 | 200 | E | 1.65 |
| | 15 | 400 | 0 | 200 | 0 | B | 12 | 200 | E | 2.10 |
| | 16 | 500 | 0 | 200 | 0 | B | 12 | 200 | E | 2.65 |

| | | Mix proportions | | | Test results | | | | | |
|---|---|---|---|---|---|---|---|---|---|---|
| | | | Water-hydraulic component material ratio (%) | Percent fine aggregate (%) | | | % concrete passing measured | | | |
| | Experiment No. | Water content (kg/m³) | | | Slump (cm) | Air content (%) | Volume sampled A (l) | Volume passing B (l) | % passing $\frac{B}{A} \times 1000$ (%) | Filling property evaluation |
| Comparative example | 7 | 175 | 43.0 | 50.0 | 22.0 | 1.9 | 30 | 3.0 | 10 | — |
| | 8 | 175 | 35.0 | 49.0 | 21.5 | 2.3 | 30 | 7.5 | 25 | — |
| | 9 | 175 | 35.0 | 49.0 | 22.5 | 2.1 | 30 | 15.5 | 52 | — |
| | 10 | 175 | 29.2 | 49.0 | 22.0 | 2.6 | 30 | 18.0 | 60 | X |
| | 11 | 175 | 25.0 | 48.0 | 21.5 | 2.5 | 30 | 22.5 | 75 | X |
| | 12 | 175 | 43.8 | 50.0 | 21.5 | 1.8 | 30 | 21.3 | 71 | ○ |
| | 13 | 175 | 35.0 | 49.0 | 22.0 | 1.9 | 30 | 21.9 | 73 | ○ |
| | 14 | 175 | 35.0 | 49.0 | 22.5 | 2.3 | 31 | 26.0 | 84 | ○ |
| | 15 | 175 | 29.2 | 49.0 | 22.0 | 2.6 | 30 | 27.6 | 92 | ○ |
| | 16 | 175 | 25.0 | 48.0 | 22.0 | 2.8 | 31 | 27.9 | 90 | ○ |

Note
1) Concrete testing temperature: 20-21° C.
2) Cement: ordinary portland cement (specific gravity 3.16) manufactured by Sumitomo Cement Co., Ltd.
3) Fly ash: fly ash (specific gravity 2.19, fineness 2,880 cm²/g) manufactured by EPDC Fly Ash Co., Ltd.
4) Fine aggregate: Oi River System pit sand (specific gravity 2.63, fineness modulus 2.71)
5) Coarse aggregate: Ome sandstone crushed stone (specific gravity 2.64, maximum particle diameter 20 mm)
6) Water-soluble polymer substance: Hi-metrose (B:65SH-4000) manufactured by The Shin-Etsu Chemical Co., Ltd.
7) High-range air-entraining, water-reducing agent E: Rheobild SP-9HS manufactured by Nisso Master Builders Co., Ltd. (dosages indicated in terms of dry weight)

TABLE 3

| | | Mix proportions | | | | | | | |
|---|---|---|---|---|---|---|---|---|---|
| | | Hydraulic component material | | | | Water-soluble polymer | | High-range AE water-reducing agent | |
| | Experiment No. | Cement kg/m³ | Blast-furnace slag powder kg/m³ | Fly ash kg/m³ | Expansive agent kg/m³ | Type | Amount Used (g/m³) | Viscosity when dissolved in 1000 g water (cp) | Type | Dosage kg/m³ |

TABLE 3-continued

| | Experiment No. | Cement kg/m³ | Blast-furnace slag powder kg/m³ | Fly ash kg/m³ | Expansive agent kg/m³ | Type | Amount Used (g/m³) | Viscosity when dissolved in 1000 g water (cp) | Type | Dosage kg/m³ |
|---|---|---|---|---|---|---|---|---|---|---|
| Comparative example | 17 | 300 | 100 | 0 | 0 | — | 0 | — | E | 1.40 |
| | 18 | 400 | 100 | 0 | 0 | — | 0 | — | E | 1.85 |
| | 19 | 200 | 200 | 0 | 0 | — | 0 | — | E | 1.48 |
| | 20 | 300 | 200 | 0 | 0 | — | 0 | — | E | 2.01 |
| | 21 | 400 | 200 | 0 | 0 | — | 0 | — | E | 2.67 |
| | 22 | 300 | 400 | 0 | 0 | — | 0 | — | E | 3.73 |
| | 23 | 400 | 300 | 0 | 0 | — | 0 | — | E | 3.42 |
| Example | 24 | 300 | 100 | 0 | 0 | B | 12 | 200 | E | 1.40 |
| | 25 | 400 | 100 | 0 | 0 | B | 12 | 200 | E | 1.85 |
| | 26 | 200 | 200 | 0 | 0 | B | 12 | 200 | E | 1.48 |
| | 27 | 300 | 200 | 0 | 0 | B | 12 | 200 | E | 2.01 |
| | 28 | 400 | 200 | 0 | 0 | B | 12 | 200 | E | 2.67 |
| | 29 | 300 | 400 | 0 | 0 | B | 12 | 200 | E | 3.73 |
| | 30 | 400 | 300 | 0 | 0 | B | 12 | 200 | E | 3.42 |

| | Experiment No. | Water content (kg/m³) | Water-hydraulic component material ratio (%) | Percent fine aggregate (%) | Slump (cm) | Air content (%) | Volume sampled A (l) | Volume passing B (l) | % passing $\frac{B}{A} \times 1000$ (%) | Filling property evaluation |
|---|---|---|---|---|---|---|---|---|---|---|
| Comparative example | 17 | 175 | 43.8 | 50.0 | 21.0 | 2.0 | 30 | 9.5 | 32 | — |
| | 18 | 175 | 35.0 | 49.0 | 21.5 | 1.9 | 30 | 14.9 | 49 | — |
| | 19 | 175 | 43.8 | 50.0 | 22.0 | 2.0 | 30 | 10.1 | 34 | — |
| | 20 | 175 | 35.0 | 49.0 | 21.5 | 2.2 | 31 | 12.0 | 39 | — |
| | 21 | 175 | 29.2 | 49.0 | 22.0 | 2.6 | 30 | 18.0 | 60 | X |
| | 22 | 175 | 25.0 | 48.0 | 22.0 | 2.4 | 30 | 19.7 | 66 | X |
| | 23 | 175 | 25.0 | 48.0 | 22.5 | 2.8 | 30 | 22.5 | 75 | X |
| Example | 24 | 175 | 43.8 | 50.0 | 21.5 | 2.1 | 31 | 22.6 | 73 | ○ |
| | 25 | 175 | 35.0 | 49.0 | 22.5 | 2.2 | 30 | 24.3 | 81 | ○ |
| | 26 | 175 | 43.8 | 50.0 | 22.0 | 2.0 | 30 | 22.5 | 75 | ○ |
| | 27 | 175 | 35.0 | 49.0 | 22.5 | 2.3 | 30 | 25.2 | 84 | ○ |
| | 28 | 175 | 29.2 | 49.0 | 22.0 | 2.6 | 30 | 28.2 | 94 | ○ |
| | 29 | 175 | 25.0 | 48.0 | 21.5 | 2.4 | 31 | 28.5 | 92 | ○ |
| | 30 | 175 | 25.0 | 48.0 | 22.0 | 2.9 | 30 | 24.3 | 81 | ○ |

Note
1) Concrete testing temperature: 20-21° C.
2) Cement: ordinary portland cement (specific gravity 3.16) manufactured by Sumitomo Cement Co., Ltd.
3) Blast-furnace slag powder: Esment (specific gravity 2.89, fineness 5,700 cm²/g) manufactured by Nippon Steel Corporation
4) Fine aggregate: Oi River System pit sand (specific gravity 2.63, fineness modulus 2.71)
5) Coarse aggregate: Ome sandstone crushed stone (specific gravity 2.64, maximum particle diameter 20 mm)
6) Water-soluble polymer substance: Hi-metrose (B:65SH-4000) manufactured by The Shin-Etsu Chemical Co., Ltd.
7) High-range air-entraining, water-reducing agent E: Rheobild SP-9HS manufactured by Nisso Master Builders Co., Ltd. (dosages indicated in terms of dry weight)

TABLE 4

| | Experiment No. | Cement kg/m³ | Blast-furnace slag powder kg/m³ | Fly ash kg/m³ | Expansive agent kg/m³ | Type | Amount Used (g/m³) | Viscosity when dissolved in 1000 g water (cp) | Type | Dosage kg/m³ |
|---|---|---|---|---|---|---|---|---|---|---|
| Comparative example | 31 | 100 | 100 | 200 | 0 | — | 0 | — | E | 1.24 |
| | 32 | 100 | 200 | 100 | 0 | — | 0 | — | E | 1.32 |
| | 33 | 150 | 150 | 200 | 0 | — | 0 | — | E | 1.65 |
| | 34 | 150 | 200 | 150 | 0 | — | 0 | — | E | 1.79 |
| | 35 | 180 | 180 | 240 | 0 | — | 0 | — | E | 2.39 |
| | 36 | 180 | 180 | 240 | 0 | B | 48 | 10000 | E | 2.39 |
| | 37 | 180 | 180 | 240 | 0 | C | 18 | 8000 | E | 2.39 |
| | 38 | 215 | 215 | 270 | 0 | B | 48 | 10000 | E | 3.06 |
| Example | 39 | 100 | 100 | 200 | 0 | B | 12 | 200 | E | 1.24 |
| | 40 | 100 | 200 | 100 | 0 | B | 12 | 200 | E | 1.32 |
| | 41 | 150 | 150 | 200 | 0 | B | 12 | 200 | E | 1.65 |
| | 42 | 150 | 200 | 150 | 0 | B | 12 | 200 | E | 1.79 |
| | 43 | 180 | 180 | 240 | 0 | B | 6 | 22 | E | 2.39 |
| | 44 | 180 | 180 | 240 | 0 | B | 12 | 200 | E | 2.39 |
| | 45 | 180 | 180 | 240 | 0 | B | 24 | 1900 | E | 2.39 |
| | 46 | 215 | 215 | 270 | 0 | B | 12 | 200 | E | 2.79 |
| | 47 | 180 | 180 | 240 | 0 | C | 3 | 9 | E | 2.39 |
| | 48 | 180 | 180 | 240 | 0 | C | 6 | 78 | E | 2.39 |
| | 49 | 180 | 180 | 240 | 0 | C | 12 | 1100 | E | 2.39 |
| | 50 | 180 | 180 | 240 | 0 | A | 24 | 420 | E | 2.39 |
| | 51 | 180 | 180 | 240 | 0 | D | 3 | 12 | E | 2.39 |
| | 52 | 170 | 180 | 240 | 10 | B | 12 | 200 | E | 2.39 |
| | 53 | 170 | 180 | 240 | 10 | B | 12 | 200 | F | 0.70 |

TABLE 4-continued

|  | No. | (kg/m³) | (%) | (%) | (cm) | (%) | (l) | (l) | (%) | evaluation |
|---|---|---|---|---|---|---|---|---|---|---|
| Comparative example | 31 | 175 | 43.8 | 50.0 | 19.5 | 1.9 | 30 | 11.4 | 38 | — |
|  | 32 | 175 | 43.8 | 50.0 | 19.0 | 1.8 | 30 | 12.0 | 40 | — |
|  | 33 | 175 | 35.0 | 50.0 | 20.5 | 2.0 | 30 | 16.5 | 55 | — |
|  | 34 | 175 | 35.0 | 50.0 | 20.0 | 2.4 | 30 | 15.6 | 52 | — |
|  | 35 | 175 | 29.2 | 50.0 | 21.0 | 2.1 | 30 | 18.9 | 63 | X |
|  | 36 | 175 | 29.2 | 50.0 | 20.0 | 2.3 | 31 | 18.6 | 60 | X |
|  | 37 | 175 | 29.2 | 50.0 | 22.0 | 2.3 | 31 | 23.1 | 77 | X |
|  | 38 | 175 | 25.0 | 49.0 | 23.0 | 2.6 | 30 | 22.2 | 74 | X |
| Example | 39 | 175 | 43.8 | 50.0 | 22.0 | 2.1 | 30 | 22.2 | 74 | ○ |
|  | 40 | 175 | 43.8 | 50.0 | 22.5 | 2.0 | 30 | 23.4 | 78 | ○ |
|  | 41 | 175 | 35.0 | 50.0 | 23.0 | 2.4 | 30 | 24.0 | 80 | ○ |
|  | 42 | 175 | 35.0 | 50.0 | 22.5 | 2.8 | 30 | 23.7 | 79 | ○ |
|  | 43 | 175 | 29.2 | 50.0 | 22.0 | 2.3 | 30 | 23.4 | 78 | ○ |
|  | 44 | 175 | 29.2 | 50.0 | 23.0 | 2.4 | 30 | 30.0 | 100 | ◉ |
|  | 45 | 175 | 29.2 | 50.0 | 22.0 | 2.6 | 31 | 25.7 | 83 | ○ |
|  | 46 | 175 | 35.0 | 49.0 | 22.5 | 2.9 | 30 | 29.1 | 97 | ○ |
|  | 47 | 175 | 29.2 | 50.0 | 23.0 | 2.4 | 31 | 31.0 | 100 | ◉ |
|  | 48 | 175 | 29.2 | 50.0 | 22.5 | 2.4 | 31 | 27.9 | 90 | ○ |
|  | 49 | 175 | 29.2 | 50.0 | 22.0 | 2.3 | 30 | 24.6 | 82 | ○ |
|  | 50 | 175 | 29.2 | 50.0 | 22.5 | 2.3 | 30 | 29.4 | 98 | ◉ |
|  | 51 | 175 | 29.2 | 50.0 | 23.0 | 2.5 | 31 | 28.2 | 91 | ○ |
|  | 52 | 175 | 29.2 | 50.0 | 22.5 | 2.3 | 30 | 30.0 | 100 | ◉ |
|  | 53 | 175 | 29.2 | 50.0 | 21.5 | 2.5 | 30 | 30.0 | 100 | ◉ |

Note
1) Concrete testing temperature: 20-21° C.
2) Cement: ordinary portland cement (specific gravity 3.16) manufactured by Sumitomo Cement Co., Ltd.
3) Blast-furnace slag powder: Esment (specific gravity 2.89, fineness 5,700 cm²/g) manufactured by Nippon Steel Corporation
4) Fly ash: fly ash (specific gravity 2.19, fineness 2,880 cm²/g) manufactured by EPDC Fly Ash Co., Ltd.
5) Expansive agent: Tascon P manufactured by Denki Kagaku Kogyo Kabushiki Kaisha
6) Fine aggregate: Oi River System pit sand (specific gravity 2.63, fineness modulus 2.71)
7) Coarse aggregate: Ome sandstone crushed stone (specific gravity 2.64, maximum particle diameter 20 mm)
8) Water-soluble polymer substance: Metrose (A:65SH-400), Hi-metrose (B:65SH-4000, C:90SH-15000, D:90SH-30000) manufactured by The Shin-Etsu Chemical Co., Ltd.
9) High-range air-entraining, water-reducing agent E: Rheobild SP-9HS, F: Rheobild SP-8N manufactured by Nisso Master Builders Co., Ltd. (dosages indicated in terms of dry weight)

The concrete for placement in air not requiring consolidation according to the method of this invention, compared with ordinary concrete, has performances greatly improved and possesses the characteristics as follows:

① High fluidity and excellent deformability
② Excellent segregation resistance
③ Extreme reduction of bleeding
④ Space filling properties permitting placement to be done without consolidation

We claim:

1. Concrete composition for placement in air without requiring consolidation, which excels in fluidity and shows little segregation and high deformability, comprising:
   portland cement in a mixture of at least one of blast-furnace slag powder, expansive agent, fly ash, silica powder and natural mineral powder, in quantity of 400–700 kg/m³;
   water in a quantity of not more than 175 kg/m³;
   a water-soluble polymer in such a quantity as will yield a viscosity in a range of 5 to 2,000 centipoises when dissolved in 1,000 g of water at 20° C. and 0.003–0.014 wt. % on the basis of the amount of water used; and
   an air-entraining, water-reducing agent of an admixture that reduces the quantity of mixing water required to produce concrete at a given consistency of 12% or greater in a quantity of 0.1 to 2% by dry weight based on the amount of said portland cement mixture, wherein said concrete is free of an anti-foaming agent.

2. The concrete composition for placement in air not requiring consolidation as claimed in claim 1, wherein fineness of powder of said portland cement mixture is from 2,500 to 7,000 cm²/g in terms of Blaine value.

3. The concrete composition for placement in air not requiring consolidation as claimed in claim 1 or 2, wherein said water-soluble polymer is selected from the group consisting of gum arabic, a substance having a base of cellulose, a substance having a base of acrylic compound, a substance having a base of arylamide, and a substance having a base of polyvinyl alcohol.

4. The concrete composition for placement in air not requiring consolidation as claimed in claim 1, wherein the water-reducing agent is a surface-active agent of high dispersing capability without incurring excessive set retardation selected from the group consisting of formalin condensates of β-napthalene sulfonates, formalin condensates of melamine sulfonates, polystyrene sulfonates, hydroxy polyacrylates, copolymers of α, β-unsaturated dicarboxylic acid and olefin, copolymers derived from polyethylene glycol monoallyl ethers and maleic acid-base monomers, copolymers of isobutylene-styrene maleic acid base, isobutylene-acrylic acid ester-maleic acid base, isobutylene-styrene-acrylic acid ester-maleic acid base, denatured lignosulfonate compounds, and aromatic amniosulfonic acid-based high molecular compounds as main ingredients.

5. The concrete composition for placement in air without requiring consolidation, as claimed in claim 1, further including an additive fiber selected from the group consisting of steel fiber, stainless steel fiber, glass fiber, carbon fiber, aramid fiber, vinylon fiber, alumina fiber, asbestos, polypropylene fiber, polyethylene fiber, acrylic fiber, nylon fiber, mineral, amorphous metal fiber, silicon carbide fiber, potassium titanate fiber, and boron fiber.

* * * * *